(12) United States Patent
Allard

(10) Patent No.: US 10,634,110 B2
(45) Date of Patent: Apr. 28, 2020

(54) MAGNETO TIMING CONTROL

(71) Applicant: Eric Allard, Mulberry, FL (US)

(72) Inventor: Eric Allard, Mulberry, FL (US)

( * ) Notice: Subject to any disclaimer, the term of this patent is extended or adjusted under 35 U.S.C. 154(b) by 0 days.

(21) Appl. No.: 16/146,595

(22) Filed: Sep. 28, 2018

(65) Prior Publication Data

US 2019/0301420 A1  Oct. 3, 2019

Related U.S. Application Data

(60) Provisional application No. 62/565,075, filed on Sep. 28, 2017.

(51) Int. Cl.
| | |
|---|---|
| *F02P 5/16* | (2006.01) |
| *F02P 5/02* | (2006.01) |
| *F16H 7/08* | (2006.01) |
| *F16H 7/02* | (2006.01) |
| *F02N 3/04* | (2006.01) |

(52) U.S. Cl.
CPC ....... *F02P 5/16* (2013.01); *F02P 5/02* (2013.01); *F16H 7/023* (2013.01); *F16H 7/08* (2013.01); *F02N 3/04* (2013.01); *F16H 2007/088* (2013.01); *F16H 2007/0846* (2013.01); *F16H 2007/0874* (2013.01); *F16H 2007/0893* (2013.01)

(58) Field of Classification Search
CPC .............. F01L 1/348; F02P 5/02; F02P 5/16
See application file for complete search history.

(56) References Cited

U.S. PATENT DOCUMENTS

| | | | | |
|---|---|---|---|---|
| 3,441,009 | A | * 4/1969 | Rafanelli | F01L 1/348 123/90.15 |
| 4,576,127 | A | * 3/1986 | Doi | F01L 1/024 123/90.15 |
| 4,715,333 | A | * 12/1987 | Oyaizu | F01L 1/02 123/90.27 |

FOREIGN PATENT DOCUMENTS

| | | | | |
|---|---|---|---|---|
| DE | 3406100 A1 | * 8/1985 | | F01L 1/348 |
| DE | 3904696 A1 | * 10/1989 | | F01L 1/348 |
| DE | 4026013 A1 | * 2/1992 | | F02B 67/06 |
| GB | 191128062 A | * 11/1912 | | F16H 7/08 |
| GB | 343612 A | * 2/1931 | | F16H 7/1254 |
| JP | 58178042 A | * 10/1983 | | F16H 7/023 |
| JP | 02125141 A | * 5/1990 | | |

OTHER PUBLICATIONS

Roth, DE 3406100, machine translation (Year: 1985).*
Wende, DE 3904696, machine translation (Year: 1989).*
Mahlberg, DE 4026013, machine translation (Year: 1992).*
Shimizu, JP S58-178042, machine translation (Year: 1983).*
Fujikoso, JP H02-125141, machine translation (Year: 1990).*

\* cited by examiner

*Primary Examiner* — Hung Q Nguyen
*Assistant Examiner* — Mark L. Greene
(74) *Attorney, Agent, or Firm* — Cygnet IP Law, P.A.; Stephen W. Aycock, II

(57) ABSTRACT

A magneto timing control system is described. The magneto timing control system can include an element configured to adjust tension of one of a first section of a belt and a section of the belt, wherein the belt is in communication with at least one magneto. The tension of the first section of the belt and the second section of the belt control a timing advance and a timing retard of the at least one magneto.

6 Claims, 6 Drawing Sheets

MAGNETO TIMING CONTROL

RELATED APPLICATIONS

This application claims the benefit of U.S. Application No. 62/565,075, entitled "Magneto Timing Control," filed on Sep. 28, 2018, which is incorporated herein by reference in its entirety.

TECHNICAL FIELD

Some implementations relate generally to magnetos, and more particularly, to improved timing control systems for engines having a single magneto or two or more magnetos.

BACKGROUND

Some motorcycles may be difficult to start when cold or hot, and may be especially difficult to kick start. Occasionally, when kick starting a motorcycle, the engine may fire prematurely and cause the engine to kick back against a rider trying to start the motorcycle. This kick back may cause injury to the rider.

Adjusting the timing of the motorcycle engine may help the engine to start more easily and help avoid the kick back situation. However, adjusting magneto timing on conventional engines may be difficult or in inconvenient.

Some implementations were conceived in light of the above mentioned problems or limitations, among other things.

SUMMARY

Some implementations can include a magneto timing control system comprising an element configured to adjust tension of one of a first section of a belt and a section of the belt, wherein the belt is in communication with at least one magneto, and wherein tension of the first section of the belt and the second section of the belt control a timing advance and a timing retard of the at least one magneto.

DETAILED DESCRIPTION

Figure 1:
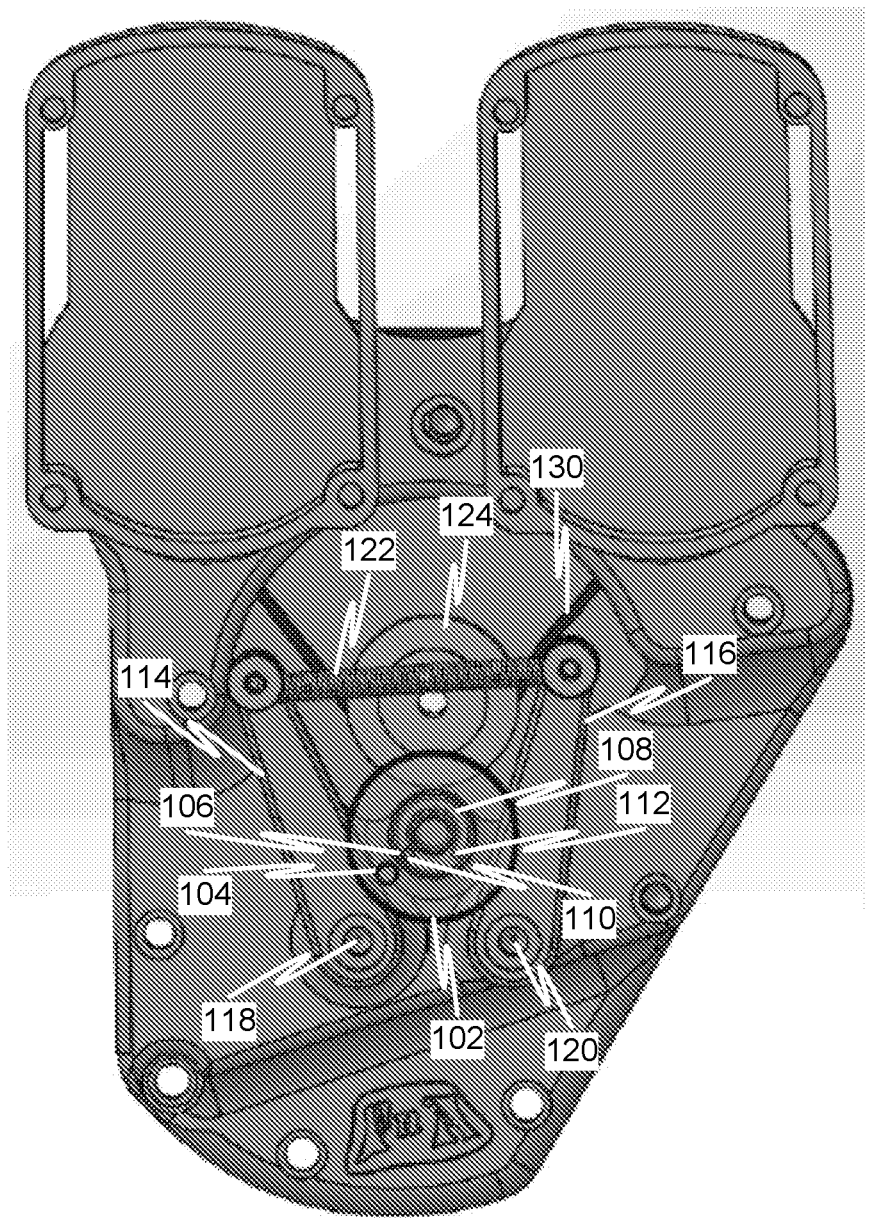
FIG. 1 is a diagram of a front view of an example magneto timing control system for a dual magneto engine in accordance with some implementations.

FIGS. 1-5 are diagrams of an example magneto timing control system 100 in accordance with some implementations. The magneto timing control system 100 includes a control knob 102 having a front surface, a circular side surface that can be knurled to provide a better grip to a user, and a back surface, wherein the control knob 102 is attached to a shaft and arranged to rotate about an axis of the shaft. The system 100 includes a first protrusion 104 attached to the back surface of the control knob 102 and extending in a backward direction away from the back surface of the control knob 102.

The system 100 also includes a guide member 108 having a semicircular pathway with a first end 110 and a second end 112. The system 100 further includes a second protrusion 106 attached to the back surface of the control knob 102 and extending in a backward direction away from the back surface of the control knob 102, the second protrusion 106 in radial alignment with the first protrusion 104, wherein the second protrusion 106 is configured to move in an arcuate path along the semicircular pathway of the guide member 108.

The system also includes a central pulley 124, a first magneto pulley 132 attached to a shaft of a first magneto, and an optional second magneto pulley 134 attached to a shaft of an optional second magneto. The system 100 includes a continuous belt 130 extending around an exterior of the central pulley 124, the first magneto pulley 132 and the second magneto pulley 134.

The system also includes a first tension arm 114 configured to rotate about a first tension arm attachment point 118 and biased by a tension arm spring 122 so as to apply tension to the belt 130 at a first section of the belt 130 extending between the central pulley 124 and the first magneto pulley 132. The system 100 also includes a second tension arm 116 configured to rotate about a second tension arm attachment point 120 and biased by the spring 122 so as to apply tension to the belt 130 at a second section of the belt 130 extending between the central pulley and the second magneto pulley 134.

Figure 2:
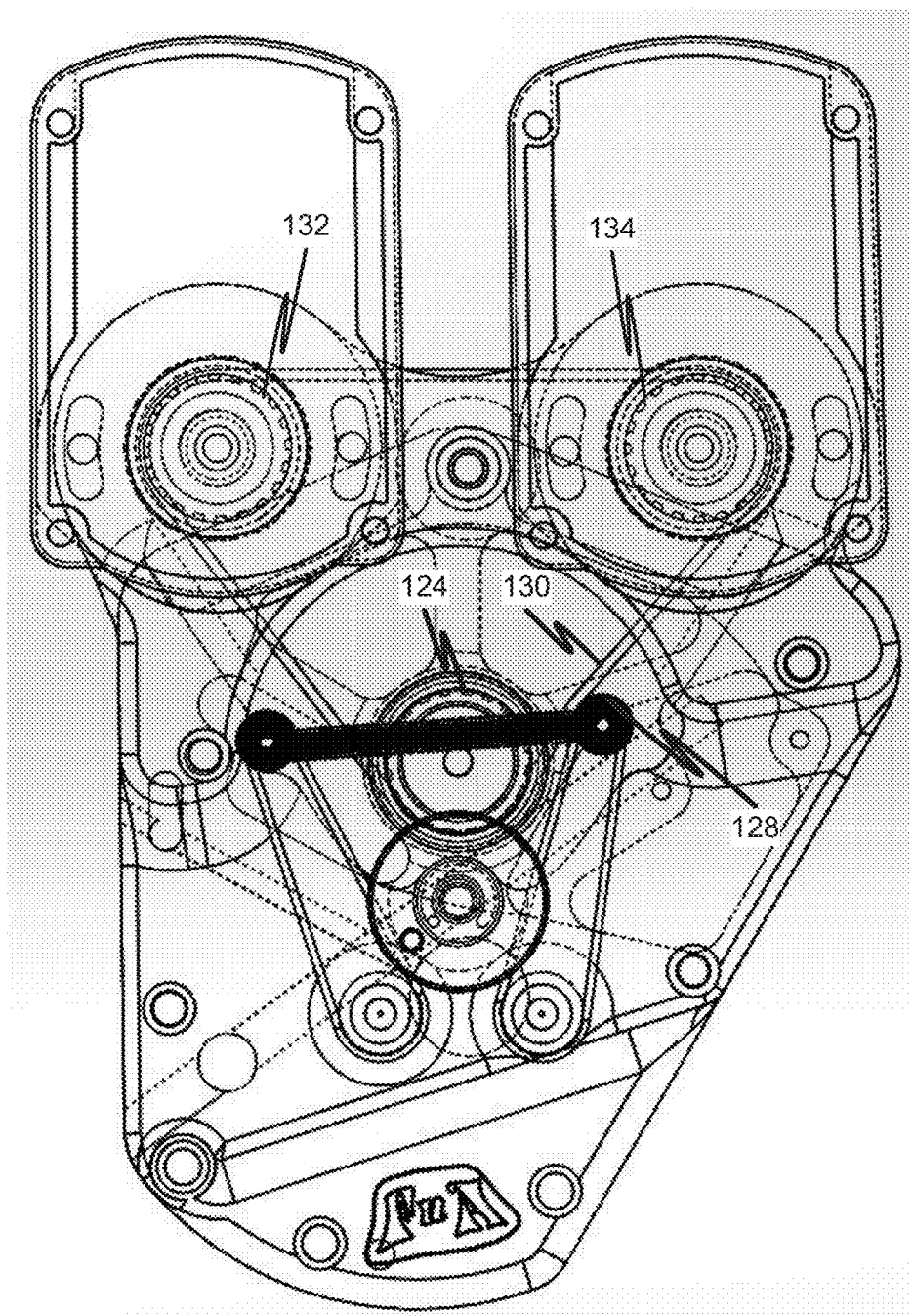
FIG. 2 is a diagram of a front view of an example magneto timing control system for a dual magneto engine in accordance with some implementations.
Figure 3:
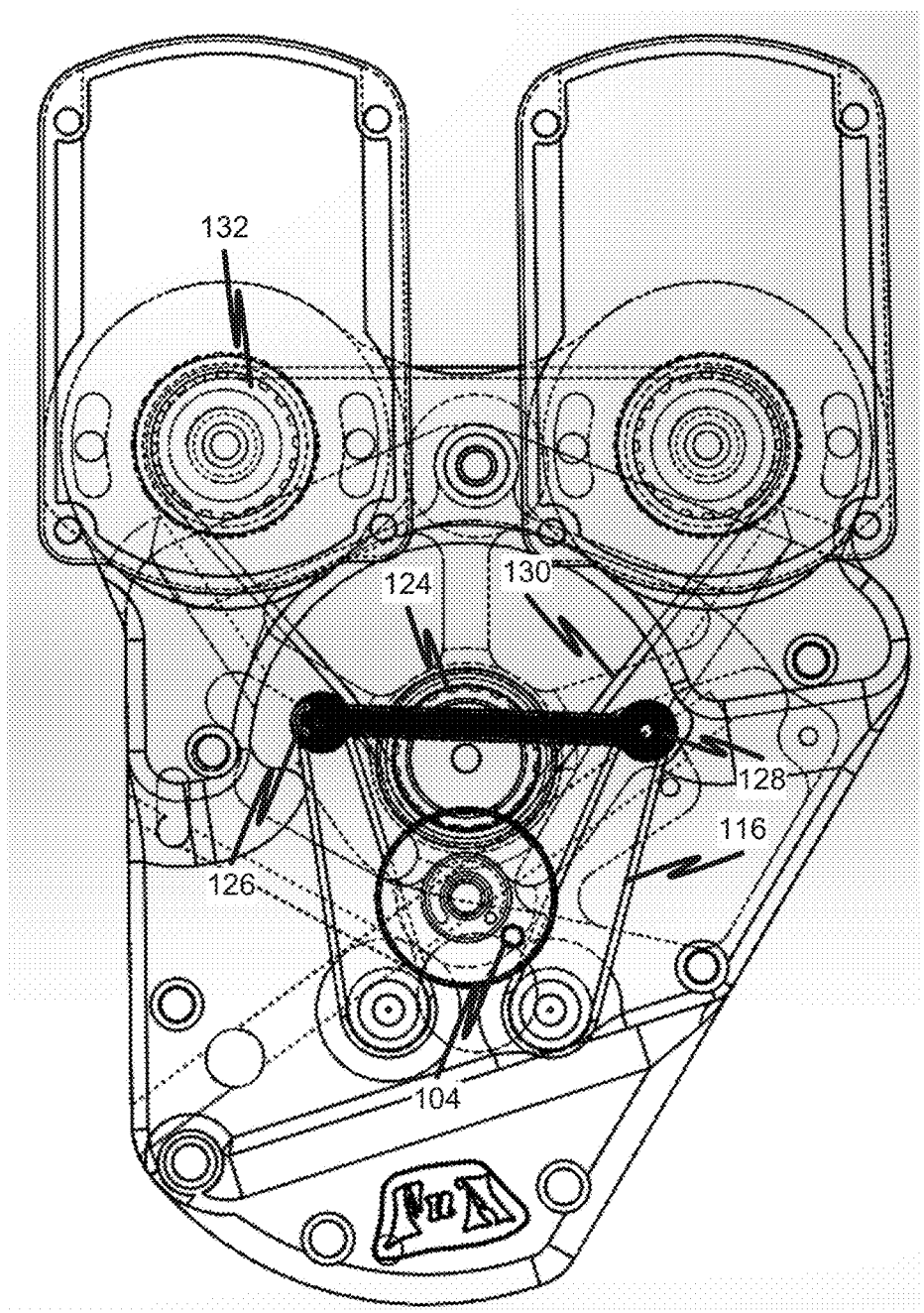
FIG. 3 is a diagram of a front view of an example magneto timing control system for a dual magneto engine in accordance with some implementations.
Figure 4:
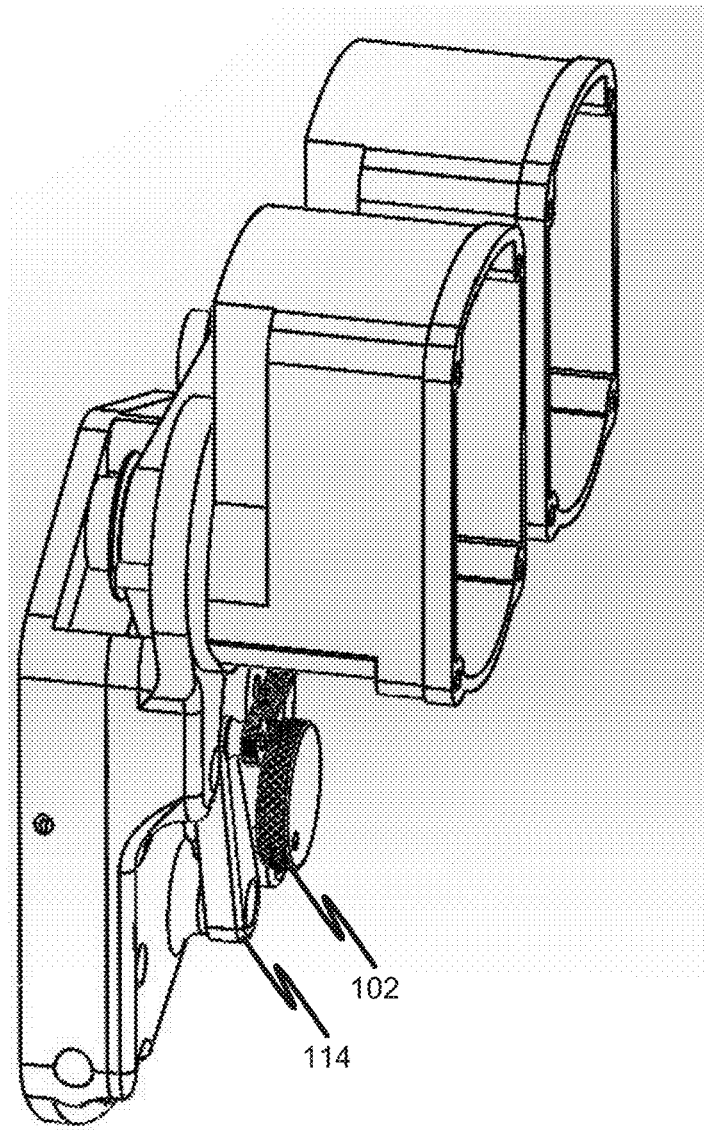
FIG. 4 is a diagram showing a side perspective view of an example magneto timing control system for a dual magneto engine in accordance with some implementations.
Figure 5:
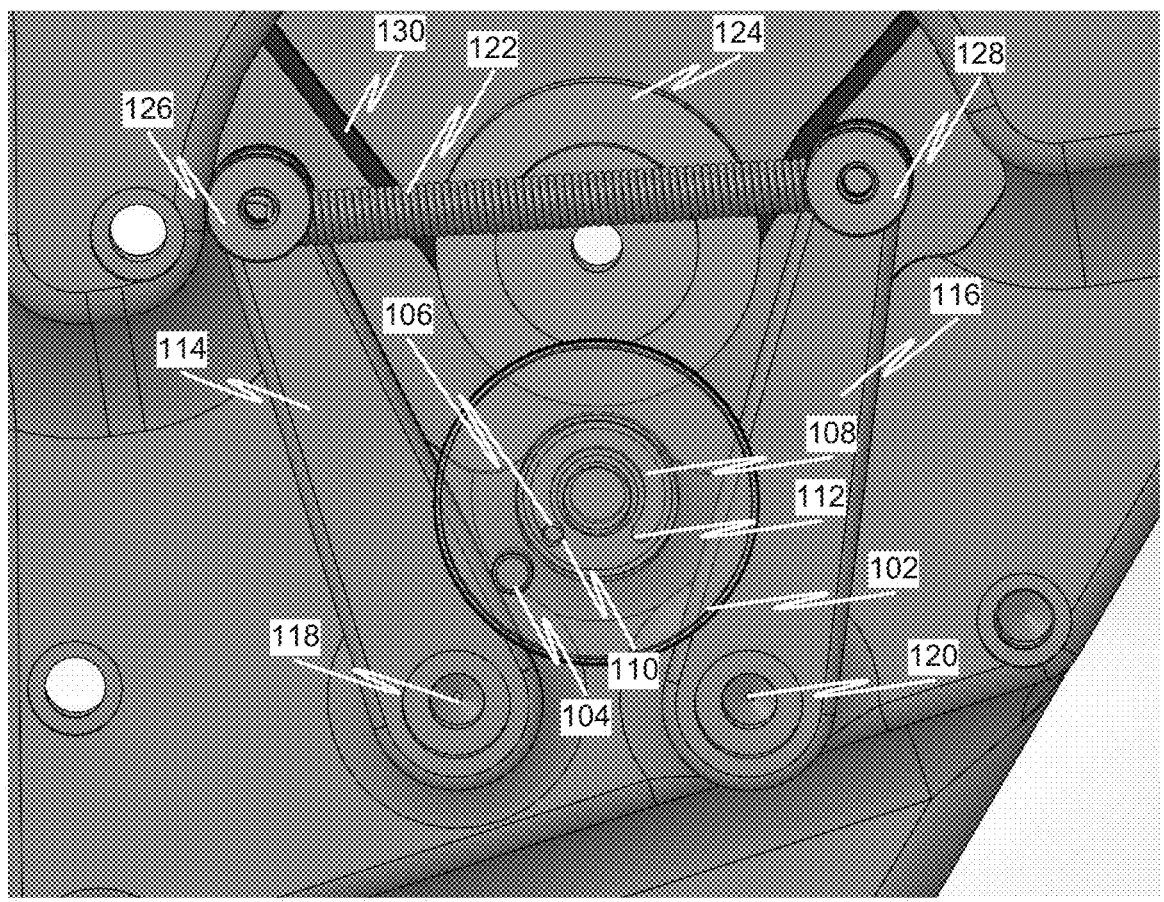
FIG. 5 is a diagram showing a close up view of an example magneto timing control system for a dual magneto engine in accordance with some implementations.

When the control knob is rotated to a first position (i.e., timing advance position as shown in FIGS. 1, 2, and 4) in which the second protrusion 106 contacts the first end of the guide member 110, the first protrusion 104 contacts and acts against the first tension arm 114 causing the first tension arm 114 to remove tension from the belt 130 at the first section of the belt, which changes the magneto timing (e.g., advances the magneto timing). When the control knob is rotated to a second position (i.e., timing retard position, as shown in FIG. 3) in which the second protrusion 106 contacts the second end 112 of the guide member 108, the first protrusion 104 contacts and acts against the second tension arm 116 causing the second tension arm 116 to remove tension from the belt 130 at the second section of the belt 130. In some implementations, the first position is a magneto timing advance position and the second position is a magneto timing retard position. In some implementations, the belt 130 can be a toothed belt.

Figure 6:
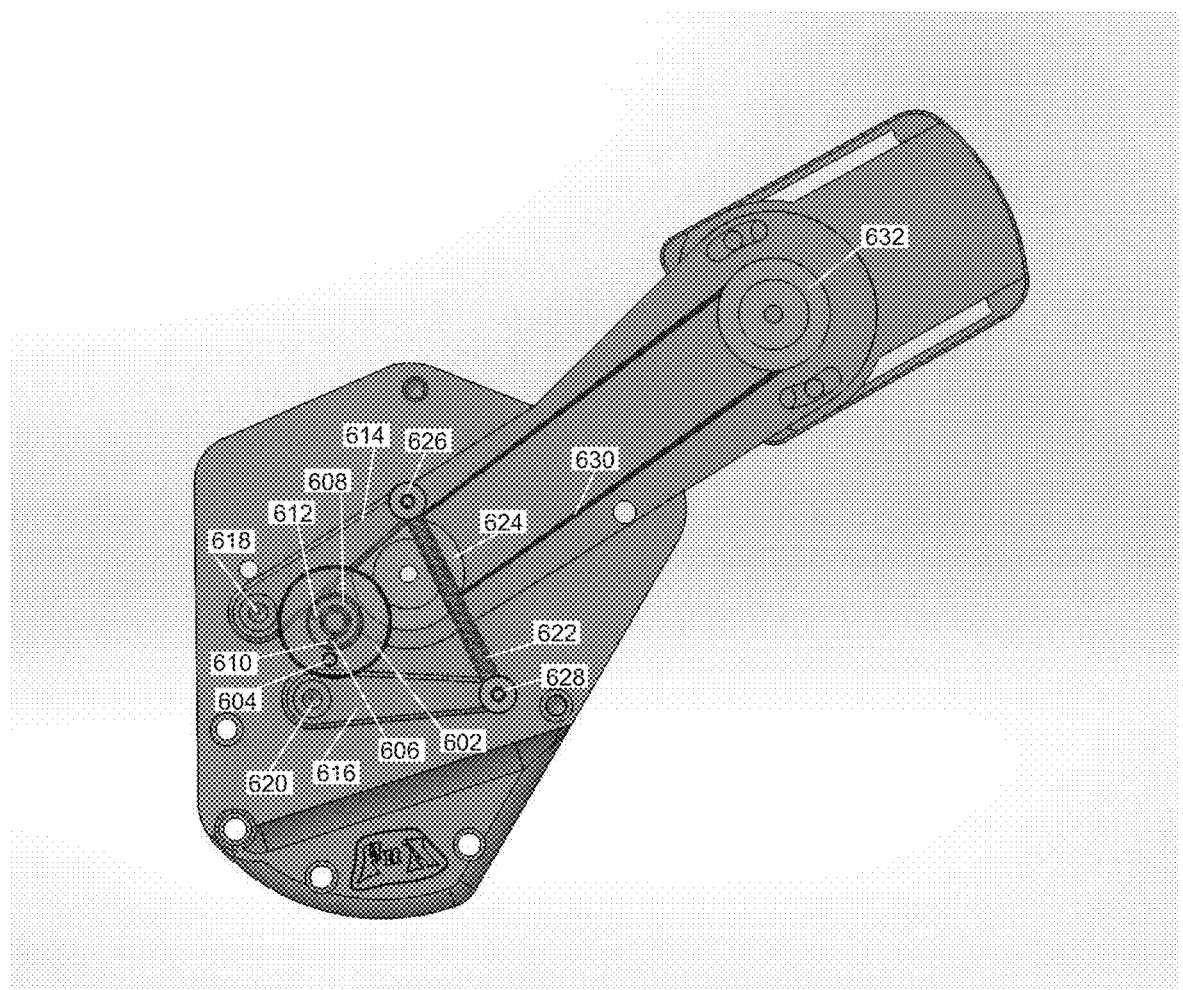
FIG. 6 is a diagram of a front view of an example magneto timing control system for a single magneto engine in accordance with some implementations.

Some implementations include a magneto timing control system similar to that described above except that there is no second magneto pulley or second magneto. As shown in FIG. 6, a single magneto timing control system 600 can include a control knob 602 having a front surface, a circular side surface, and a back surface, wherein the control knob 602 is attached to a shaft and arranged to rotate about an axis of the shaft.

The system 600 includes a first protrusion 604 attached to the back surface of the control knob 102 and extending in a backward direction away from the back surface of the control knob 602.

The system 600 also includes a guide member 608 having a semicircular pathway with a first end 610 and a second end 612. The system 600 further includes a second protrusion 106 attached to the back surface of the control knob 602 and extending in a backward direction away from the back surface of the control knob 602, the second protrusion 606 in radial alignment with the first protrusion 604, wherein the second protrusion 606 is configured to move in an arcuate path along the semicircular pathway of the guide member 608.

The system also includes a central pulley 624, a single magneto pulley 632 attached to a shaft of a single magneto. The system 600 includes a continuous belt 130 extending around an exterior of the central pulley 624 and the single magneto pulley 632.

The system also includes a first tension arm 614 configured to rotate about a first tension arm attachment point 618 and biased by a tension arm spring 622 so as to apply tension to the belt 630 at a first section of the belt 630 extending between the central pulley 624 and the single magneto pulley 632. The system 600 also includes a second tension arm 616 configured to rotate about a second tension arm attachment point 620 and biased by the spring 622 so as to apply tension to the belt 630 at a second section of the belt 630 extending between the central pulley and the single magneto pulley 632.

When the control knob 602 is rotated to a first position (i.e., timing advance position) in which the second protrusion 606 contacts the first end of the guide member 610, the first protrusion 604 contacts and acts against the first tension arm 614 causing the first tension arm 614 to remove tension from the belt 630 at the first section of the belt, which changes the magneto timing (e.g., advances the magneto timing). When the control knob 602 is rotated to a second position (i.e., timing retard position) in which the second protrusion 606 contacts the second end 612 of the guide member 608, the first protrusion 604 contacts and acts against the second tension arm 616 causing the second tension arm 616 to remove tension from the belt 630 at the second section of the belt 630. In some implementations, the first position is a magneto timing advance position and the second position is a magneto timing retard position.

In some implementations, the belt 630 can be a toothed belt.

In some implementations, the control knob (e.g., 102 or 602) can include an arm coupled to the control know and that extends from the control knob to provide leverage for a user in turning the control knob using the arm.

It is, therefore, apparent that there is provided, in accordance with the various implementations disclosed herein, magneto timing control systems.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A magneto timing control system comprising:
   a control knob having a front surface, a circular side surface, and a back surface, wherein the control knob is attached to a shaft and arranged to rotate about an axis of the shaft;
   a first protrusion attached to the back surface of the control knob and extending in a backward direction away from the back surface of the control knob;
   a guide member having a semicircular pathway with a first end and a second end;
   a second protrusion attached to the back surface of the control knob and extending in a backward direction away from the back surface of the control knob, the second protrusion in radial alignment with the first protrusion, wherein the second protrusion is configured to move in an arcuate path along the semicircular pathway of the guide member;
   a central pulley;
   a first magneto pulley attached to a shaft of a first magneto;
   a second magneto pulley attached to a shaft of a second magneto;
   a continuous belt extending around an exterior of the central pulley, the first magneto pulley and the second magneto pulley;
   a first tension arm configured to rotate about a first tension arm attachment point and biased by a tension arm spring operable to apply tension to the belt at a first section of the belt extending between the central pulley and the first magneto pulley; and
   a second tension arm configured to rotate about a second tension arm attachment point and biased by the tension arm spring operable to apply tension to the belt at a second section of the belt extending between the central pulley and the second magneto pulley,
   wherein when the control knob is rotated to a first position in which the second protrusion contacts the first end of the guide member, the first protrusion contacts and acts against the first tension arm causing the first tension arm to remove tension from the belt at the first section of the belt, which changes the magneto timing, and
   wherein when the control knob is rotated to a second position in which the second protrusion contacts the second end of the guide member, the first protrusion contacts and acts against the second tension arm causing the second tension arm to remove tension from the belt at the second section of the belt.

2. The system of claim 1, wherein the first position is a magneto timing advance position and the second position is a magneto timing retard position.

3. The system of claim 1, wherein the belt is a toothed belt.

4. A magneto timing control system comprising:
   a control knob having a front surface, a circular side surface, and a back surface, wherein the control knob is attached to a shaft and arranged to rotate about an axis of the shaft;
   a first protrusion attached to the back surface of the control knob and extending in a backward direction away from the back surface of the control knob;
   a guide member having a semicircular pathway with a first end and a second end;
   a second protrusion attached to the back surface of the control knob and extending in a backward direction away from the back surface of the control knob, the second protrusion in radial alignment with the first protrusion, wherein the second protrusion is configured to move in an arcuate path along the semicircular pathway of the guide member;
   a central pulley;
   a magneto pulley attached to a shaft of a magneto;
   a continuous belt extending around an exterior of the central pulley and the magneto pulley;

a first tension arm configured to rotate about a first tension arm attachment point and biased by a tension arm spring operable to apply tension to the belt at a first section of the belt; and a second tension arm configured to rotate about a second tension arm attachment point and biased by the tension arm spring operable to apply tension to the belt at a second section of the belt, wherein when the control knob is rotated to a first position in which the second protrusion contacts the first end of the guide member, the first protrusion contacts and acts against the first tension arm causing the first tension arm to remove tension from the belt at the first section of the belt, which changes the magneto timing, and wherein when the control knob is rotated to a second position in which the second protrusion contacts the second end of the guide member, the first protrusion contacts and acts against the second tension arm causing the second tension arm to remove tension from the belt at the second section of the belt.

5. The system of claim 4, wherein the first position is a magneto timing advance position and the second position is a magneto timing retard position.

6. The system of claim 4, wherein the belt is a toothed belt.

* * * * *